(12) United States Patent
Ip et al.

(10) Patent No.: US 11,982,552 B2
(45) Date of Patent: May 14, 2024

(54) VIBRATION DETECTION USING PHASE RECOVERED FROM AN OPTICAL TRANSPONDER WITH COHERENT DETECTION

(71) Applicant: NEC Laboratories America, Inc., Princeton, NJ (US)

(72) Inventors: Ezra Ip, West Windsor, NJ (US); Yue-Kai Huang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 145 days.

(21) Appl. No.: 17/544,806

(22) Filed: Dec. 7, 2021

(65) Prior Publication Data

US 2022/0236083 A1    Jul. 28, 2022

Related U.S. Application Data

(60) Provisional application No. 63/192,188, filed on May 24, 2021, provisional application No. 63/122,611, filed on Dec. 8, 2020.

(51) Int. Cl.
*G01D 5/353* (2006.01)
*G01H 9/00* (2006.01)
*H04B 10/61* (2013.01)

(52) U.S. Cl.
CPC ......... *G01D 5/35361* (2013.01); *G01H 9/004* (2013.01); *H04B 10/6165* (2013.01)

(58) Field of Classification Search
CPC . G01D 5/35361; G01H 9/004; H04B 10/6165
See application file for complete search history.

(56) References Cited

U.S. PATENT DOCUMENTS

| 11,387,929 B1 * | 7/2022 | Zhang | H04B 10/614 |
| 2009/0142076 A1 * | 6/2009 | Li | H04B 10/6165 |
| | | | 398/208 |
| 2021/0010836 A1 * | 1/2021 | Hino | G01D 5/35358 |

FOREIGN PATENT DOCUMENTS

| EP | 3460441 A1 | 3/2019 |
| WO | 2019189192 A1 | 10/2019 |

\* cited by examiner

*Primary Examiner* — Dominic J Bologna
(74) *Attorney, Agent, or Firm* — Joseph Kolodka

(57) ABSTRACT

Aspects of the present disclosure describe systems, methods, and structures for vibration detection using phase recovered from an optical transponder with coherent detection. Advantageously, our systems, methods, and structures leverage contemporary digital coherent receiver architecture in which various adaptive DSP operations performed to recover transmitted data track optical phase. The phase is extracted at low overhead cost, allowing a digital coherent transponder to perform vibration detection/monitoring as an auxiliary function to data transmission. Demonstration of vibration detection and localization based on the extraction of optical phase from payload-carrying telecommunications signal using a coherent receiver in a bidirectional WDM transmission system is shown and described.

8 Claims, 18 Drawing Sheets

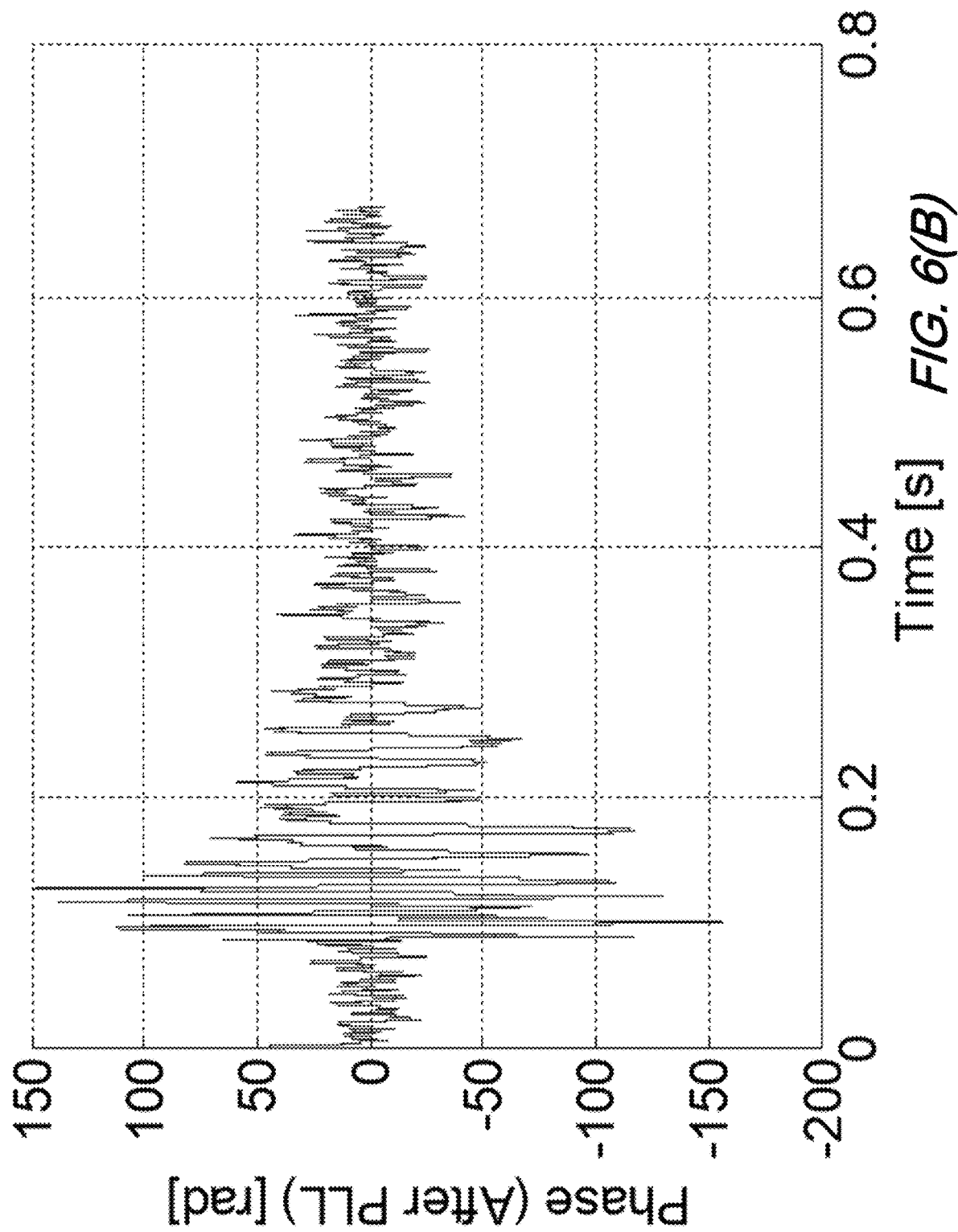

$\hat{\theta}[n] \rightarrow \boxed{DPLL} \rightarrow \boxed{BPF} \rightarrow \boxed{AEQ} \rightarrow \phi'_{vib}[n]$

FIG. 12

VIBRATION DETECTION USING PHASE RECOVERED FROM AN OPTICAL TRANSPONDER WITH COHERENT DETECTION

CROSS REFERENCE TO RELATED APPLICATIONS

This application claims the benefit of U.S. Provisional Patent Application Ser. No. 63/122,611 filed 8 Dec. 2020 and 63/192,188 filed 24 May 2021 the entire contents of each is incorporated by reference as if set forth at length herein.

TECHNICAL FIELD

This disclosure relates generally to optical communications systems, methods, and structures that employ coherent receivers. More particularly, it describes vibration detection using phase recovered from an digital optical transponder with coherent detection, allowing the digital coherent transponder to perform vibration detection/monitoring as an auxiliary function to data transmission.

BACKGROUND

As is known in the optical communications arts, transponders utilizing coherent detection are widely deployed and optical phase is continuously tracked in digital signal processors (DSP) by a combination of frequency offset compensation (FOC), adaptive time-domain equalization (TDE) and carrier phase recovery (CPR). In addition, distributed fiber optic sensing (DFOS) including distributed vibration sensing (DVS), has been shown to enhance the functionality of existing fiber optic communications facilities by simultaneously utilizing the existing, deployed communications optical fibers as sensory systems. As such, systems, methods, and structures which facilitate the utilization of existing communications facilities as sensory systems, would represent a welcome addition to the art.

SUMMARY

An advance in the art is made according to aspects of the present disclosure that advantageously provides optical communications transponders using coherent detection to provide vibration detection as an additional functionality.

In sharp contrast to the prior art, systems, methods, and structures according to the present disclosure leverages the fact that in a digital coherent receiver, various adaptive DSP operations performed to recover the transmitted data track the optical phase. This phase can be extracted at low overhead cost, allowing a digital coherent transponder to perform vibration monitoring as an auxiliary function to data transmission.

Of further advantage, systems, methods, and structures according to aspects of the present disclosure may further reduce the impact of laser phase noise as compared to prior art systems, by replacing conventional external cavity lasers (ECL) with more stable lasers exhibiting a lower frequency noise, and without wavelength dithering for a channel that will serve the dual purpose of optical transmission and vibration sensing.

Advantageously, and according to further aspects of the present disclosure, our inventive systems and methods re-use coherent optical transponders for an auxiliary function of vibration sensing thereby providing such functionality at a relatively low cost as compared with building a dedicated transponder for vibration sensing only.

BRIEF DESCRIPTION OF THE DRAWING

A more complete understanding of the present disclosure may be realized by reference to the accompanying drawing in which:

FIG. 1(A) and FIG. 1(B) are schematic diagrams illustrating vibration detection using interferometric detection of ultra-low linewidth lasers according to aspects of the present disclosure in which FIG. 1(A) shows optical phase detected at remote end using a different local oscillator (LO) laser, and FIG. 1(B) shows a signal reflected at remote end to allow optical phase to be detected at the same end using the same laser as LO.

FIG. 6(A) and FIG. 6(B) are plots showin in FIG. 6(A) phase recovered in a vibration detection experiment where $\hat{\theta}[n]$ is obtained as per Eq. (5), and FIG. 6(B) an output after passing $\hat{\theta}[n]$ through a second-order PLL with $\zeta=1/\sqrt{2}$ and $\omega_n=50$ Hz according to aspects of the present disclosure;

FIG. 12 is a schematic diagram showing illustrative extraction of phase due to vibration from phased extracted from a coherent receiver according to aspects of the present disclosure;

Figure 1A:
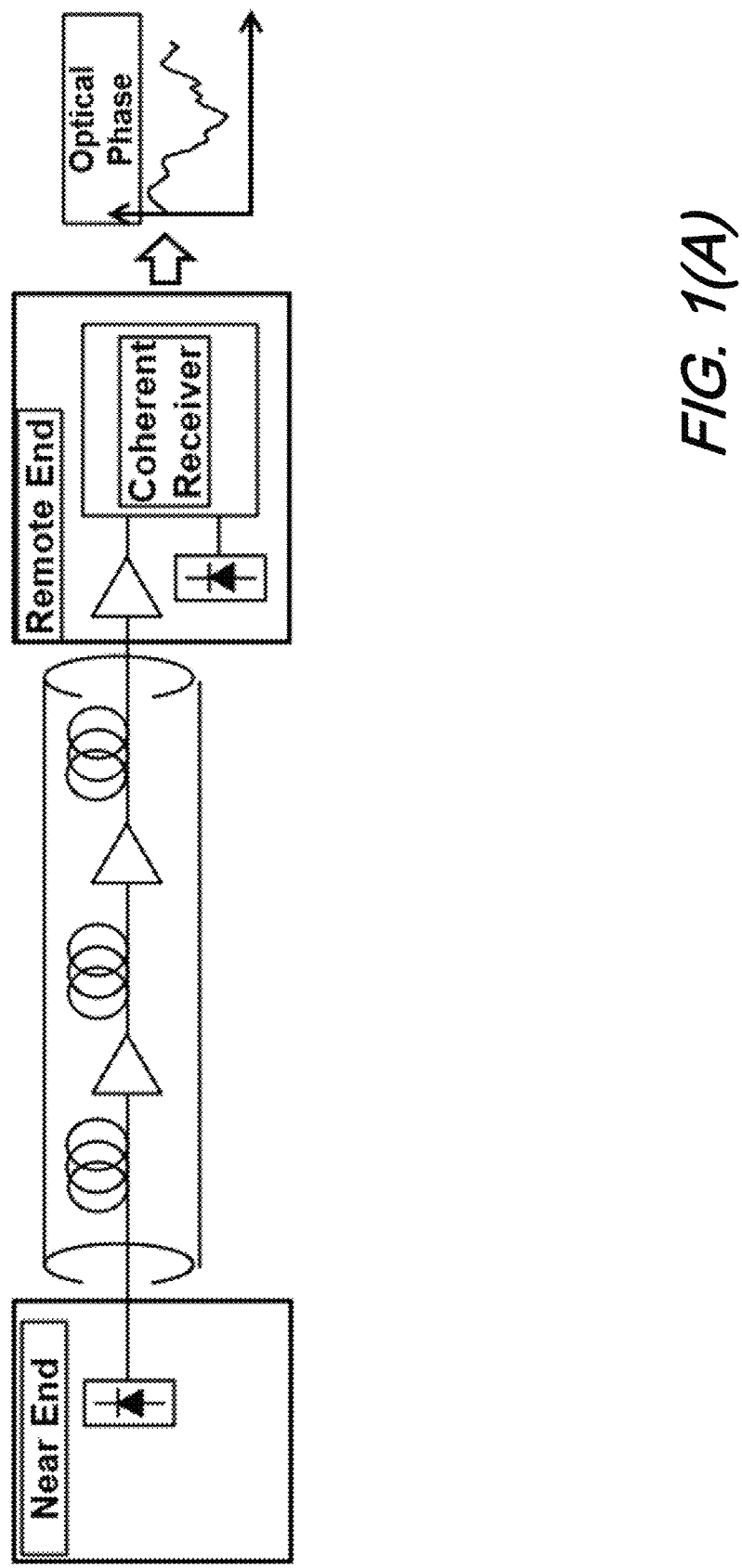

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

We note again and as those skilled in the art will understand and appreciate that mechanical vibrations imparted on an optical fiber cable can induce longitudinal strain on individual fibers inside the optical cable, manifesting in a change in optical path length $\Delta z$ which can be detected as a phase shift $\theta_{vib}=(2\pi/\lambda)\Delta z$, where $\lambda$ is the wavelength of the optical signal.

One way to measure $\theta_{vib}$ is to launch a probe pulse down an optical fiber and detect the Rayleigh back-reflection (back scatter) using distributed acoustic sensing (DAS). This method achieves high spatial resolution, but its reach is generally limited by the weak nature of the Rayleigh scattering coefficient, resulting in low optical signal-to-noise ratio (OSNR).

Recently, a forwarding approach using ultra-low linewidth lasers was proposed for detecting seismic waves in submarine cables. In this scheme, an unmodulated continuous wave (CW) laser is launched down an optical fiber of interest. At the remote end of the fiber, the received signal is coherently detected using another ultra-low linewidth laser as local oscillator (LO). The optical phase extracted from interferometric detection has the form:

$$\theta(t)=2\pi\Delta ft+(\phi_{LO}(t)-\phi_{Tx}(t))+\theta_{vib}(t)+\theta_n(t) \quad (1)$$

Where $\Delta f$ is the frequency offset between the transmitter (Tx) and LO lasers, $\phi_{Tx}(t)$ and $\phi_{Lo}(t)$ are the phase noises of the Tx and LO lasers, respectively, $\theta_{vib}(t)$ is the optical phase shift induced by cumulative longitudinal strain of the fiber, and $\theta_n(t)$ is the equivalent phase noise induced by the amplified spontaneous noise (ASE) of all the amplifiers.

We note that it is possible for the remote end to reflect the CW signal down another fiber back towards the near end, so that the same transponder can perform coherent detection using the same laser for both the outgoing signal and the LO. The goal of vibration detection is to extract $\theta_{vib}(t)$ from $\theta(t)$. Provided there exists some frequency range over which the spectrum of $\theta_{vib}(t)$ is larger than all the other terms in Eq. (1), vibration detection can be achieved.

Additionally, if the vibration is well modeled as a point source, it is possible to infer its location by launching CW signals from both ends and correlating the optical phases measured in the West-East and East-West directions.

Figure 1B:
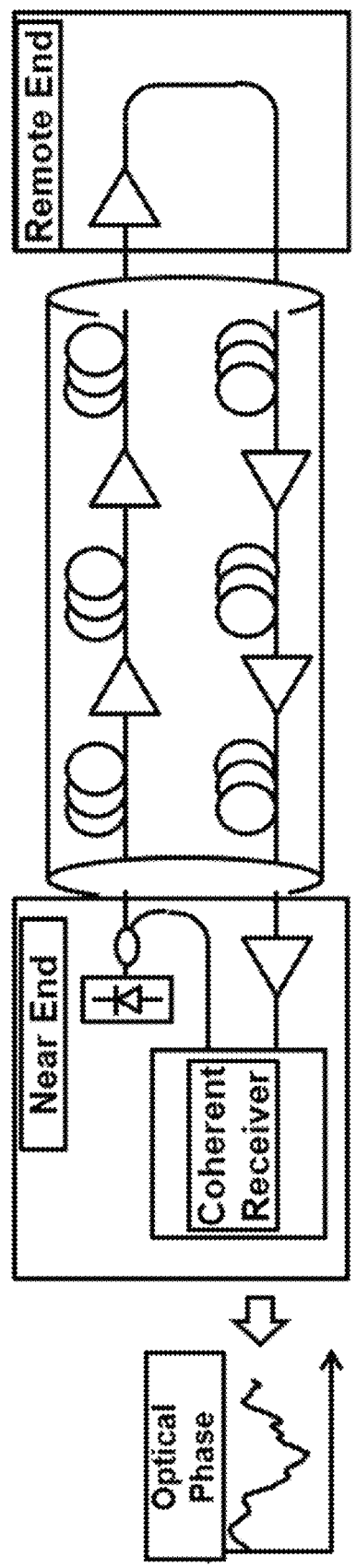

FIG. 1(A) and FIG. 1(B) are schematic diagrams illustrating vibration detection using interferometric detection of ultra-low linewidth lasers according to aspects of the present disclosure in which FIG. 1(A) shows optical phase detected at remote end using a different local oscillator (LO) laser, and FIG. 1(B) shows a signal reflected at remote end to allow optical phase to be detected at the same end using the same laser as LO.

Figure 2:
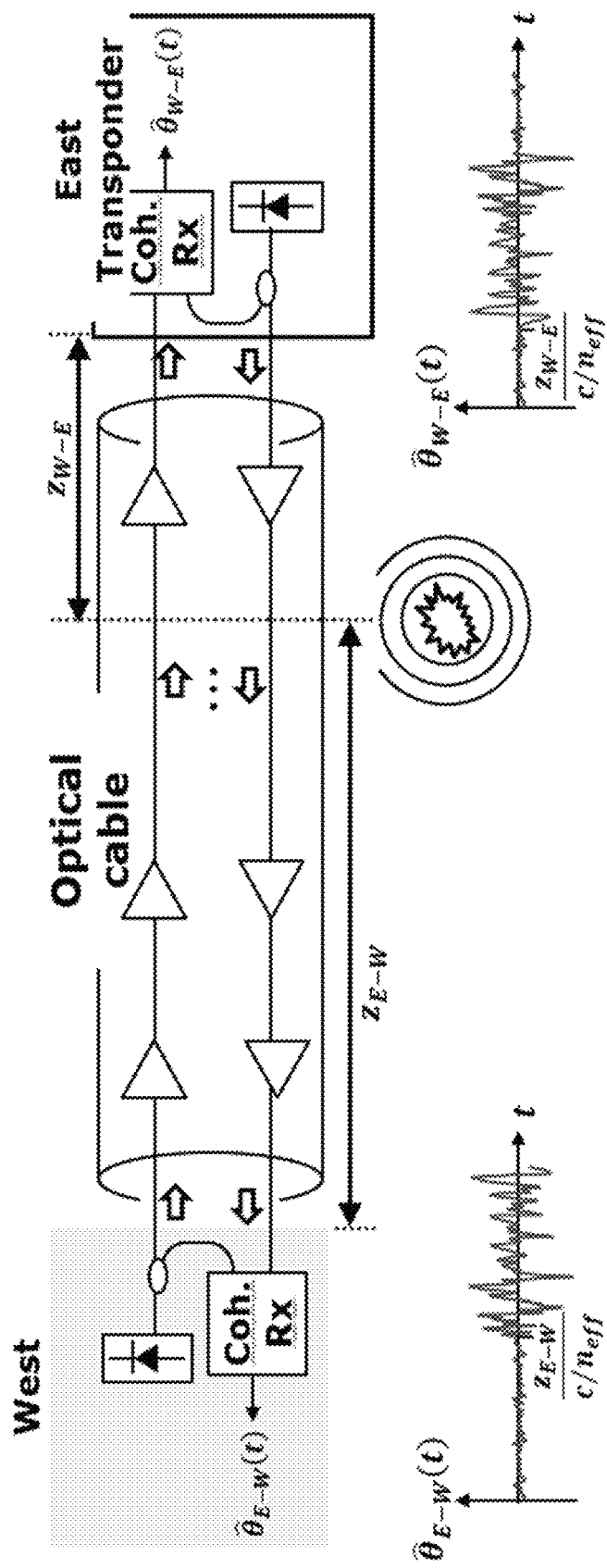
FIG. 2 illustrates determining the position of a point source vibration impinging an optical cable according to aspects of the present disclosure by correlating the optical phases in the West-to-East (W-E) and East-to-West (E-W) directions, wherein the relative delay between $\hat{\theta}'_{W-E}(t)$ and $\hat{\theta}_{E-W}(t)$ is due to difference in distance between the vibration source and each receiver.

FIG. 2 illustrates determining the position of a point source vibration impinging an optical cable according to aspects of the present disclosure by correlating the optical phases in the West-to-East (W-E) and East-to-West (E-W) directions, wherein the relative delay between $\hat{\theta}_{W-E}(t)$ and $\hat{\theta}_{E-W}(t)$ is due to difference in distance between the vibration source and each receiver.

We note that there are disadvantages with the aforementioned approach that requires transmitting a CW tone over a dedicated channel. First, the dedicated channel will no longer be carrying data. Second, the CW tone must be transmitted at low power to avoid inducing nonlinear effects on data-carrying channels (if these exist on the same fiber), and to avoid exceeding the Brillouin threshold. This latter factor is usually a more stringent requirement. The power limitation reduces the OSNR at the receiver, resulting in potentially resulting in a noisier estimate of $\theta_{vib}(t)$.

Figure 3A:
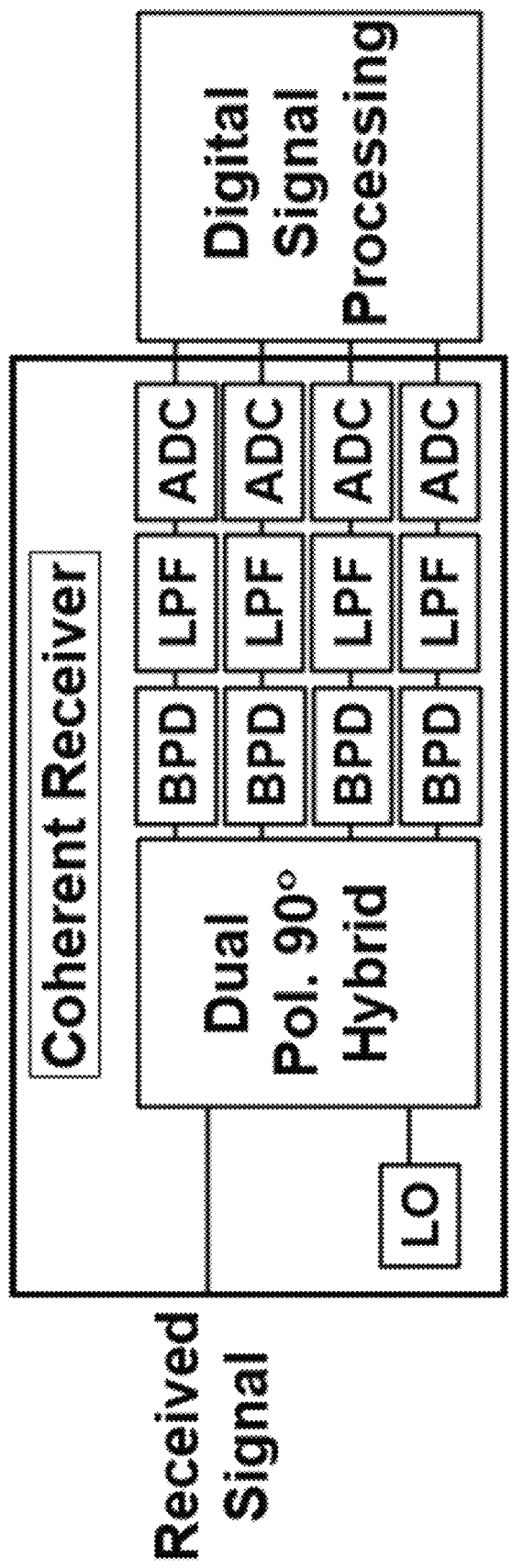
FIG. 3(A) and FIG. 3(B) show in FIG. 3(A) the canonical model of a digital coherent receiver for high-speed optical transmission, and FIG. 3(B) typical digital signal processing (DSP) operations necessary to recover the transmitted bits in which the DSP blocks highlighted jointly track the instantaneous phase of the input signal according to aspects of the present disclosure.
Figure 3B:
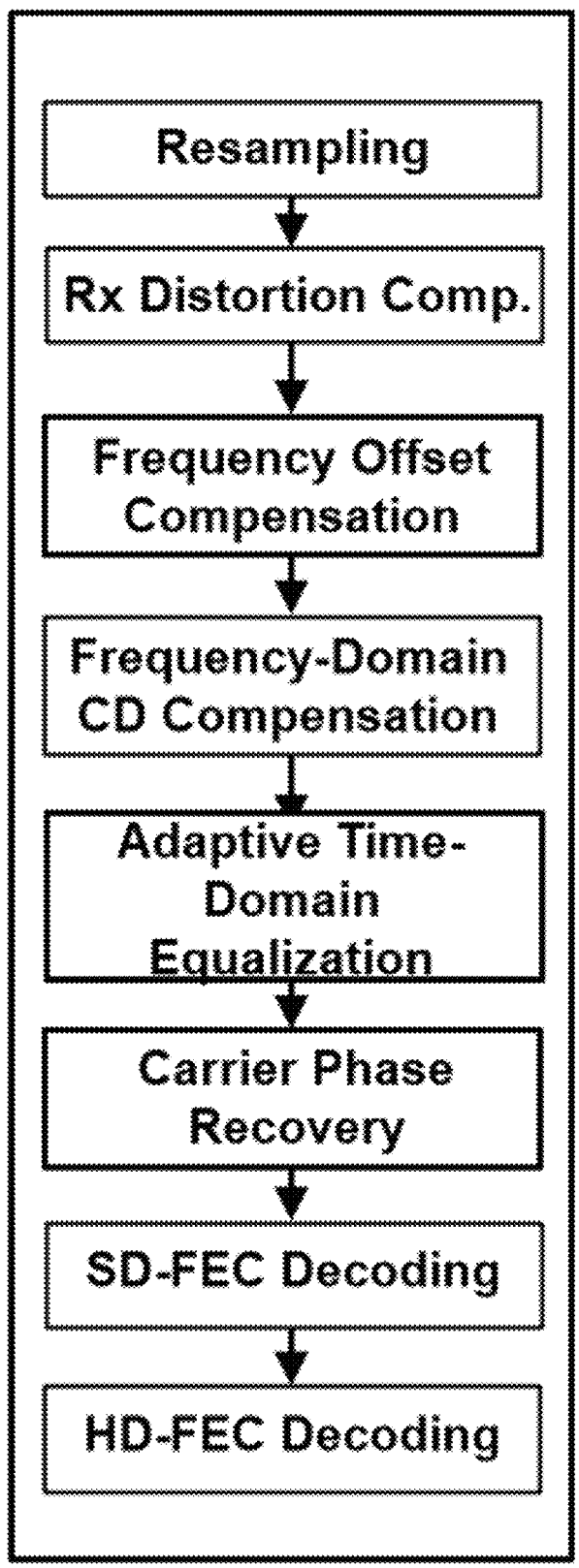

FIG. 3(A) and FIG. 3(B) show in FIG. 3(A) the canonical model of a digital coherent receiver for high-speed optical transmission, and FIG. 3(B) typical digital signal processing (DSP) operations necessary to recover the transmitted bits in which the DSP blocks highlighted jointly track the instantaneous phase of the input signal according to aspects of the present disclosure.

With reference to the figures, it may be observed that an optical front-end of the coherent receiver includes a dual-polarization 90° hybrid which combines a received signal with a local oscillator (LO) laser signal. This is followed by balanced photodetectors whose outputs comprise baseband electrical signals corresponding to in-phase and quadrature components of two received signal polarizations. The baseband electrical signals are lowpass filtered and then sampled by analog-to-digital converters (ADC) at a rate of 1/T. Provided the sampling rate exceeds twice the highest frequency component of the baseband electrical signals, the digitized waveforms retain all the information of the input optical signal.

In the DSP operations shown in the figures, the digitized waveforms are first resampled to a rate synchronous with the baud rate of the modulated data (typically twice the baud rate). Receiver imperfections, which are typically constant, are then compensated. The three adaptive components which together tracks the optical phase θ(t) are highlighted.

Operationally, the frequency offset compensation (FOC) unit rotates the signal by the estimated frequency offset Δf between the transmitter and LO lasers. Let $y[m]=[y_1[m] \; y_2[m]]^T$ be the Jones representation all complex-valued signal vectors, where m is the sample number. The FOC performs:

$$y_{FOC,out}[m]=y_{FOC,in}[m]\exp(-j2\pi\Delta\Omega m), \quad (2)$$

where $\Delta\Omega=\Delta fT$ is the digital frequency offset. The phase tracked by the FOC is thus $-2\pi\Delta\Omega m$.

After frequency-domain equalization of chromatic dispersion (CD), the signal is passed through a "butterfly-structure" adaptive time-domain equalizer (TDE) which compensates polarization rotation and polarization-mode dispersion:

$$\hat{x}_{TDE,out}[n]=w^{(n)}[m]y_{TDE,in}[m] \quad (3)$$

In Eq. (3), $$\hat{x}_{TDE,out}[n] = \begin{bmatrix} \hat{x}_{TDE,out,1[n]} \\ \hat{x}_{TDE,out,1[n]} \end{bmatrix}$$

is the n-th output symbol of the equalizer. The equalizer input $$y_{TDE,in}[m] = \begin{bmatrix} y_{TDE,in,1}[m] \\ y_{TDE,in,2}[m] \end{bmatrix},$$

with m=rn where r is the oversampling rate (typically equal to two); for each polarization i={1,2}, $$y_{TDE,in,i}[m] = \left[ y_{TDE,in,i}\left[m-\left\lfloor\frac{N}{2}\right\rfloor\right] \; \ldots \; y_{TDE,in,i}\left[m+\left\lceil\frac{N}{2}\right\rceil-1\right] \right]^T$$

is a vector of the N nearest samples to the symbol n, with N being the length of the equalizer, while $$w^{(n)} = \begin{bmatrix} w_{11}^{(n)}[m] & w_{12}^{(n)}[m] \\ w_{21}^{(n)}[m] & w_{22}^{(n)}[m] \end{bmatrix}$$

is the value of the adaptive equalizer used for recovering symbol n; each partition, and $$w_{ij}^{(n)}[m] = \left[ w_{ij}\left[-\left\lfloor\frac{N}{2}\right\rfloor\right] \; \ldots \; w_{ij}\left[\left\lceil\frac{N}{2}\right\rceil-1\right] \right]^T$$

is a vector of length N.

Finally, the equalizer output is rotated by carrier phase recovery (CPR) as:

$$\hat{x}_{CPR,out}[n]=\hat{x}_{CPR,in}\cdot\exp(-j\Delta\Phi[n]). \quad (4)$$

The output of CPR is passed through soft-decision forward error correction (SD-FEC) decoder and hard-decision FEC (HD-FEC) decoders to recover the transmitted bits.

The three DSP components which collectively track the instantaneous optical phase are highlighted in FIG. 3, and their operations as shown in Eq. (2-4). It can be shown that the phase $\hat{\theta}[n]$ tracked by the combination of FOC, TDE and CPR, which is the coherent receiver's estimate of the true phase θ(t) in Eq. (1), is given by:

$$\hat{\theta}[n] = -2\pi\Delta\Omega n + \arg\left\{\sum_{ij} \overline{w}_{ij}^{(n)} e^{-j\Delta\phi_i[n]}\right\}, \quad (5)$$

where $$\overline{w}_{ij}^{(n)} = \sum_{m=\left\lfloor\frac{N}{2}\right\rfloor}^{\left\lceil\frac{N}{2}\right\rceil-1} w_{ij}[m]$$

is the average value of the equalizer taps (or equivalently the D.C. component of the equalizer).

The overhead cost of computing Eq. (5) is only moderate, comprising additions, multiplication by phasors and an angle calculation. Furthermore, mechanical vibration and laser phase noise are slow processes compared with the baud rate of the data-modulated signal. Thus, Eq. (5) only has to be calculated infrequently at a rate of $1/T_\theta \ll 1/T$.

Figure 4:
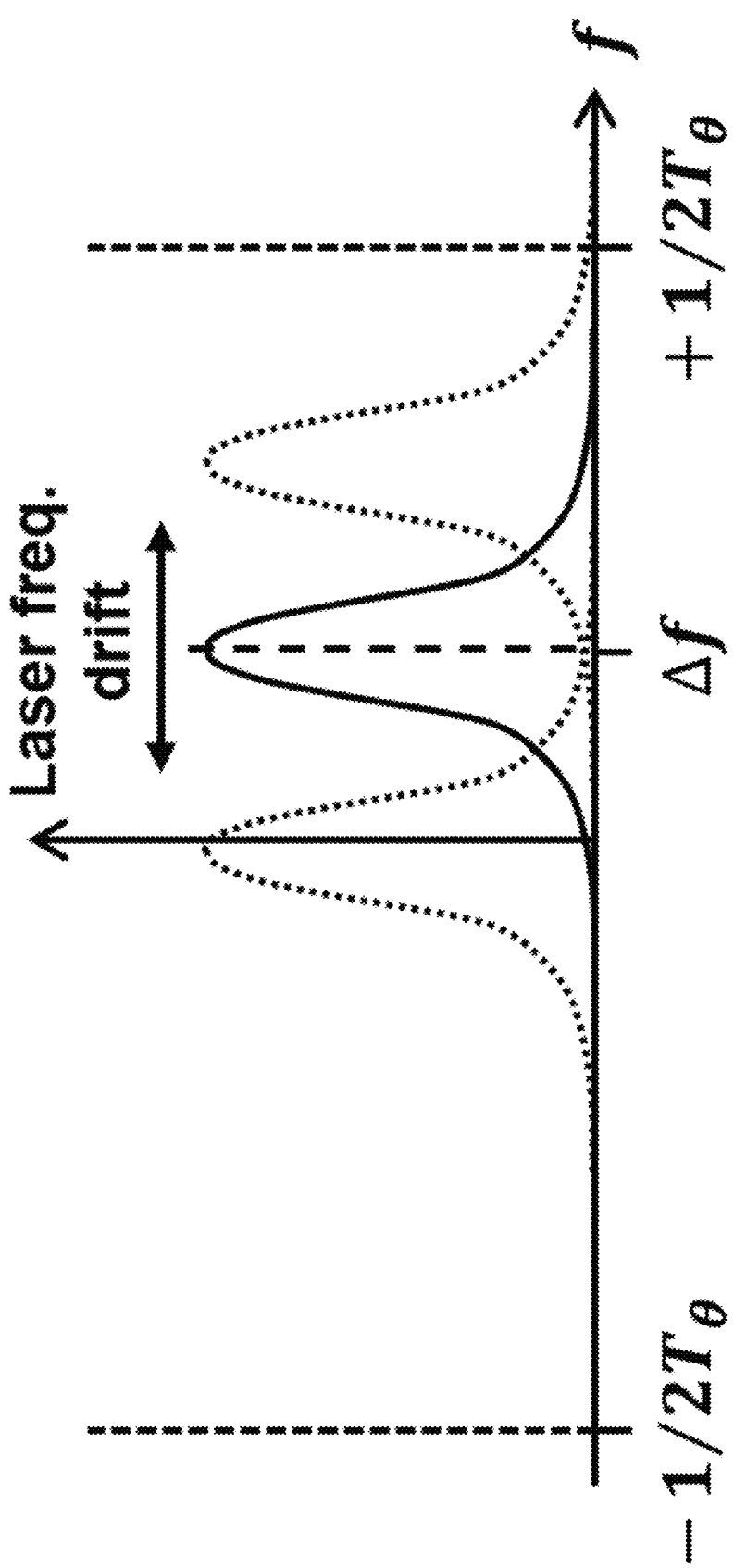
FIG. 4 is a plot Illustrating the sampling rate requirement for phase estimation in which ampling rate $1/T_\theta$ only needs to be fast enough that the aliased frequency offset does not drift more than $1/T_\theta$ according to aspects of the present disclosure.

FIG. 4 is a plot Illustrating the sampling rate requirement for phase estimation in which ampling rate $1/T_\theta$ only needs to be fast enough that the aliased frequency offset does not drift more than $1/T_\theta$ according to aspects of the present disclosure.

With reference to that figure, consider the phase evolution due to the effects of laser frequency offset ad phase noise only in Eq. (1). The spectrum of BM will be approximately Lorentzian and centered about the instantaneous frequency shift Δf. Sampling θ(t) at twice the maximum frequency offset is sufficient to satisfy the Nyquist's criterion and allow digital reconstruction of the true phase from $\hat{\theta}[n]$. In practice, even this requirement can be relaxed further, as undersampling will simply result in one of the frequency aliases of θ(t) falling within the Nyquist frequencies $-\frac{1}{2}T_\theta$ and $\frac{1}{2}T_\theta$ as shown in the figure. Provided that the lasers are stable i.e., θ(t) does not drift by more than $1/T_\theta$, it will still be possible to reconstruct θ(t). Thus, the phase in Eq. (5) only needs to be made available as often as the rate at which θ(t) can change, which is dominated by frequency drift of the laser FIG. 5 is a schematic diagram illustrating a vibration experiment using an optical cable suspended on utility poles that is struck with a hammer according to aspects of the present disclosure.

Figure 6A:
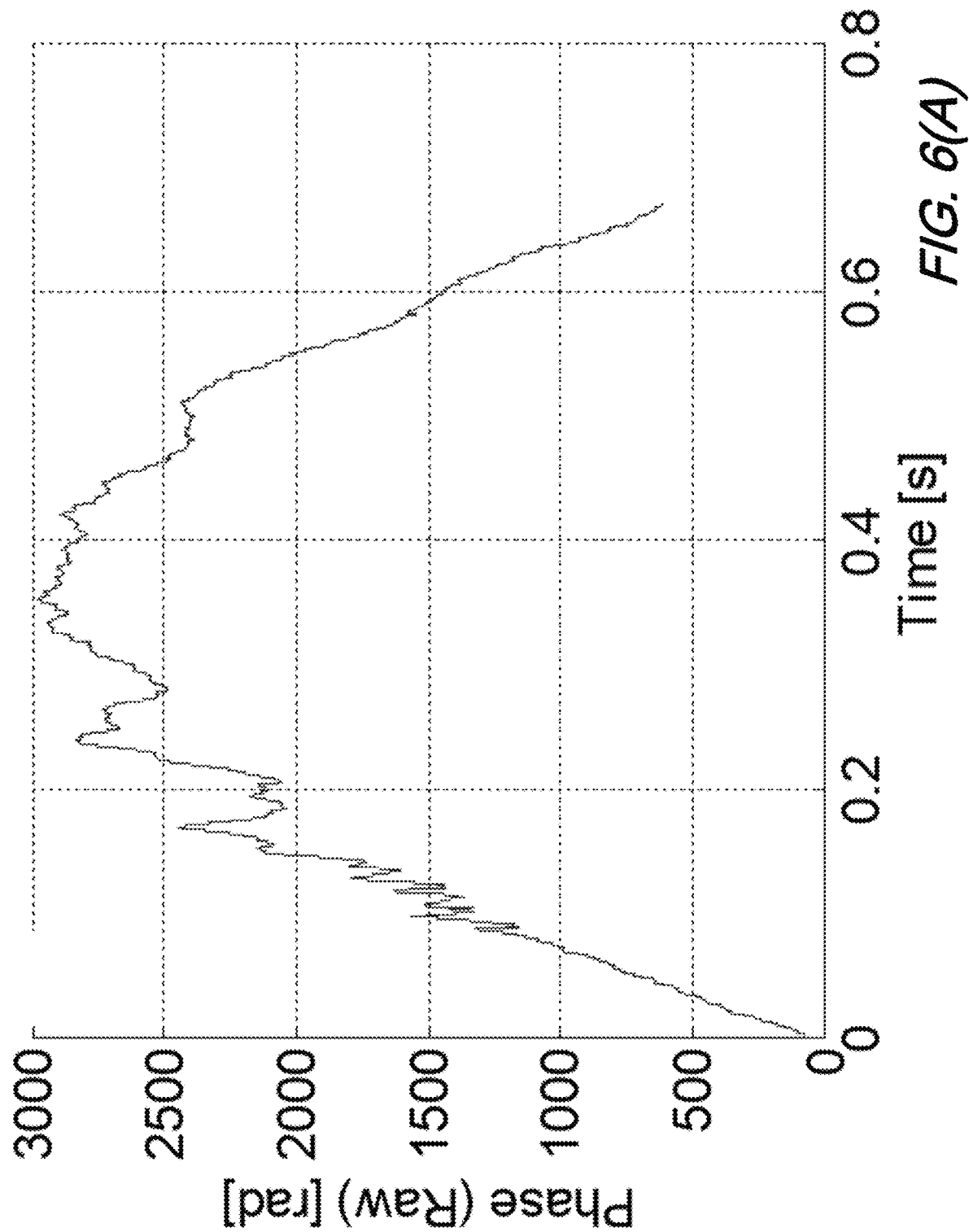

FIG. 6(A) and FIG. 6(B) are plots showin in FIG. 6(A) phase recovered in a vibration detection experiment where $\hat{\theta}[n]$ is obtained as per Eq. (5), and FIG. 6(B) an output after passing $\hat{\theta}[n]$ through a second-order PLL with $\zeta=1/\sqrt{2}$ and $\omega_n=50$ Hz according to aspects of the present disclosure.

Figure 7:
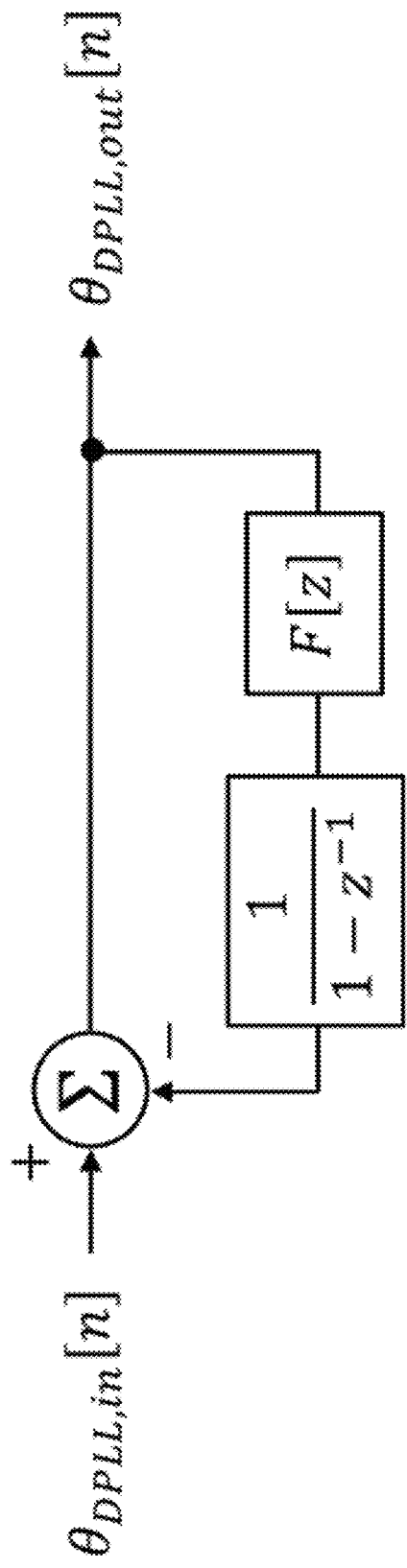
FIG. 7 is a schematic diagram illustrating a digital phase-locked loop (DPLL) with loop filter F[z] to extract vibration-induced phase change from the optical phase tracked by a coherent receiver according to aspects of the present disclosure.

FIG. 7 is a schematic diagram illustrating a digital phase-locked loop (DPLL) with loop filter F[z] to extract vibration-induced phase change from the optical phase tracked by a coherent receiver according to aspects of the present disclosure.

Figure 5:
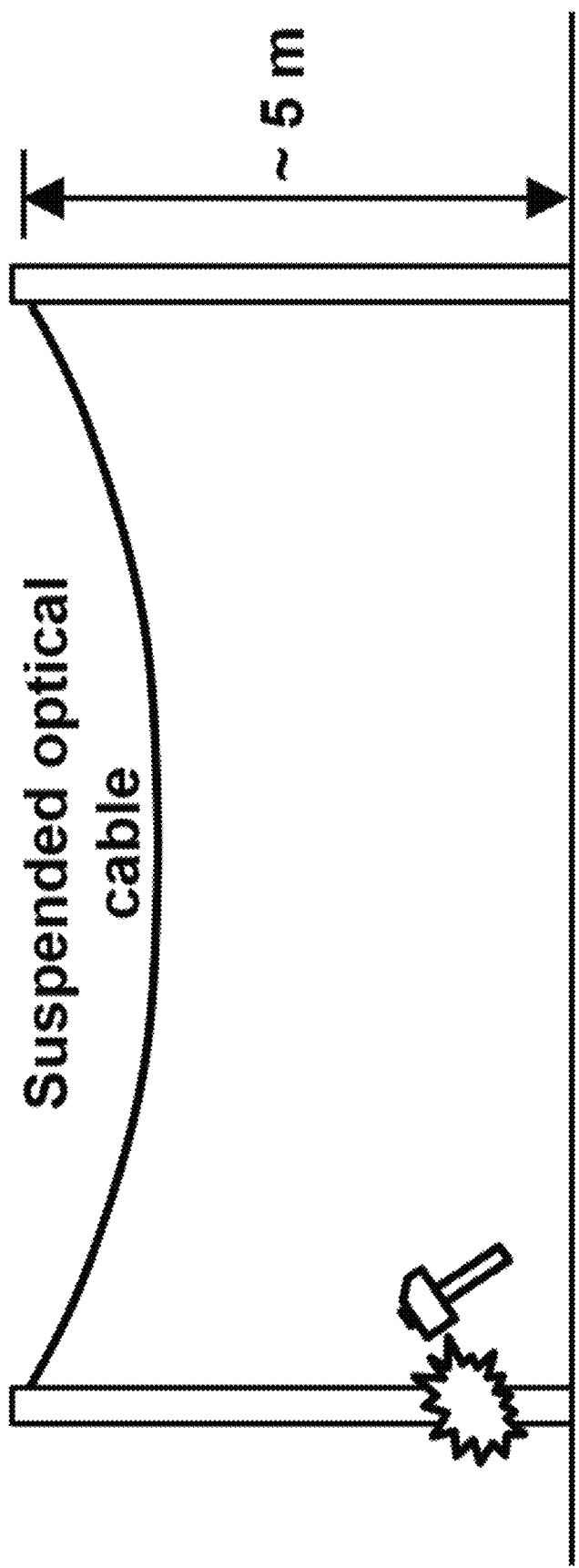
FIG. 5 is a schematic diagram illustrating a vibration experiment using an optical cable suspended on utility poles that is struck with a hammer according to aspects of the present disclosure.

With reference to the figures we note that FIG. 6(A) shows an example of the optical phase of the interferometric product between two narrow linewidth lasers, where the signal laser had passed through an optical cable suspended on utility poles that was struck with a hammer as illustrated in FIG. 5. As per Eq. (1), the sampled optical phase θ[n] is the sum of phases due to carrier frequency offset, laser phase noise and vibration-induced change in optical path length.

From FIG. 6(A), it is observed that the first two terms dominate the phase measurement. To recover the phase component $\theta_{vib}[n]$ due to vibration, we can pass B[n] through a digital phase-locked loop (DPLL) as shown illustratively in FIG. 7, where F[z] is the loop filter.

For a second-order DPLL, $$F[z] = 2\zeta\Omega_n + \frac{\Omega_n^2}{1-z^{-1}},$$

where $\zeta$ is the damping ratio, and $\Omega_n = \omega_n T$ is the natural frequency.

FIG. 6(B) shows the output $\theta_{DPLL,out}[n]$ when $\theta_{DPLL,in}[n]=\hat{\theta}[n]$ in FIG. 6(A) is passed through a critically damped second-order DPLL with $\zeta=1/\sqrt{2}$ and $\omega_n=50$ Hz. The slower-evolving carrier frequency offset has been removed while fast-fluctuating phase noise is at a much lower amplitude, and the DPLL output is an estimator of vibration-induced phase change $\theta_{DPLL,out}[n] \approx \theta_{vib}[n]$.

Figure 8:
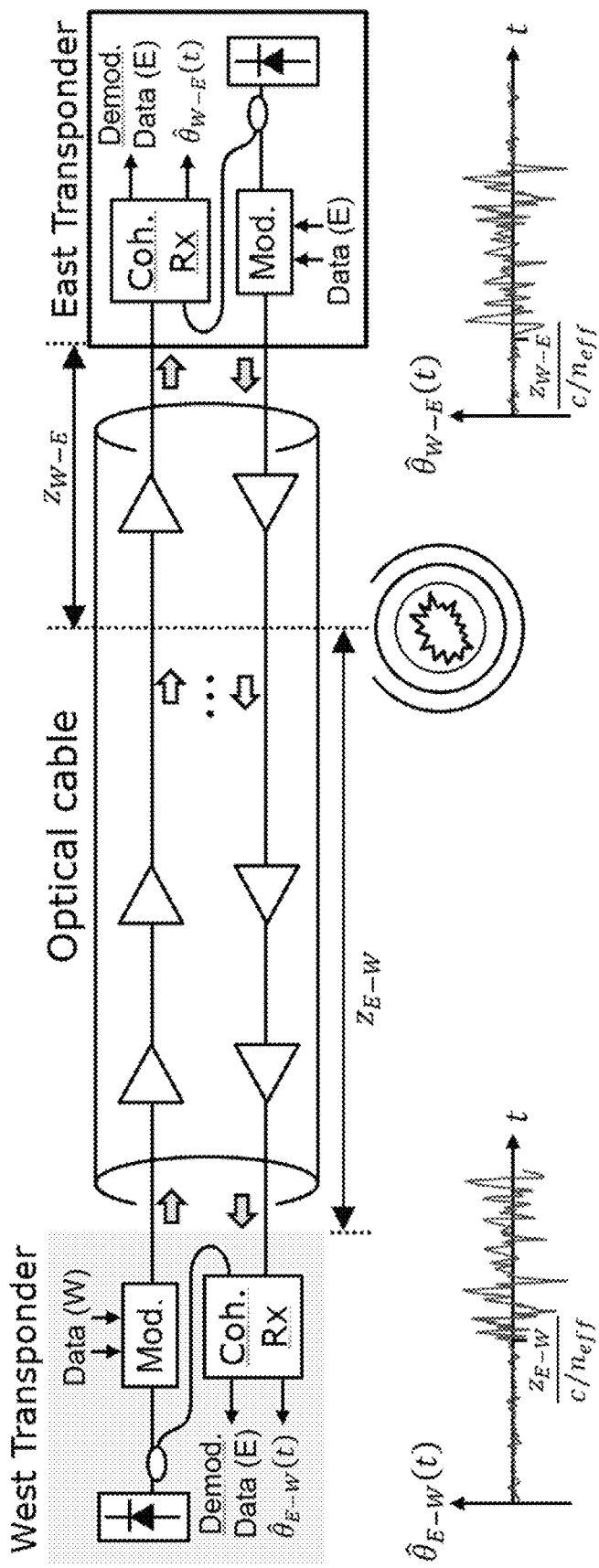
FIG. 8 is a schematic diagram showing an illustrative arrangement for determining the position of a point source vibration impinging an optical cable by correlating the optical phases in the West-to-East (W-E) and East-to-West (E-W) directions. Compared with FIG. 2, each transponder sends modulated data, and phase measurements $\hat{\theta}_{W-E}(t)$ and $\hat{\theta}_{E-W}(t)$ are recovered as part of data demodulation by each receiver, according to aspects of the present disclosure.

The DPLL output can be passed through a bandpass filter (BPF) whose passband frequencies depends on the characteristics of the vibration and how it induces phase change in the optical fiber. In the noted hammering experiment, we found that filtering between 200 Hz and 12 kHz yields good compromise between high signal-to-noise ratio for the vibration signature, and wide bandwidth which is necessary for accurate localization of the vibration position using with a bidirectional setup described in the next section. In buried optical cables, the ground tends to act as a lowpass filter which causes higher vibration frequencies to be muffled, thus the frequency range of the BPF may need to be reduced to maintain high SNR for the vibration signature FIG. 8 is a schematic diagram showing an illustrative arrangement for determining the position of a point source vibration impinging an optical cable by correlating the optical phases in the West-to-East (W-E) and East-to-West (E-W) directions. Compared with FIG. 2, each transponder sends modulated data, and phase measurements $\hat{\theta}_{W-E}(t)$ and $\hat{\theta}_{E-W}(t)$ are recovered as part of data demodulation by each receiver, according to aspects of the present disclosure.

Figure 9:
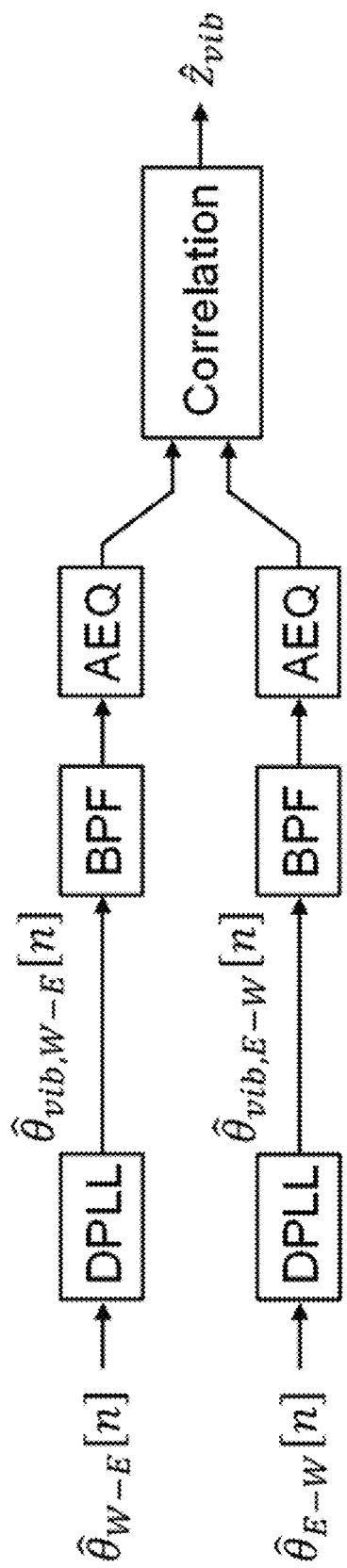
FIG. 9 is a schematic diagram showing illustrative DSP operations to determine the location of point source vibration from the optical phases tracked by two bidirectional digital coherent transponders according to aspects of the present disclosure.

With the above-noted techniques for measuring vibration-induced optical phase, it is possible to construct a bidirectional link as shown in FIG. 8 which is analogous to the configuration of FIG. 2 except for the fact that the two transponders transmit modulated data rather than unmodulated tones. As will be understood and appreciated by those skilled in the art, the receiver in each transponder estimates vibration-induced phase change as an auxiliary function to data demodulation and detection. Provided that the vibration is well-modeled as a point source, its location can be estimated by correlating the phases measured by the transponder in each direction. Let $z_{E-W}$ be the distance between the vibration source and the 'West' transponder, and let $z_{W-E}$ be the distance between the vibration source and the 'East' transponder. The phases measured by the transponders will have relative delay of $\Delta\tau=(z_{W-E}-z_{E-W})n_{eff}/c$, where $c/n_{eff}$ is the phase velocity in the fiber. $\Delta\tau$ can be estimated by correlating $\hat{\theta}_{vib,W-E}[n]$ and $d_{vib,E-W}[n]$. The uncertainty in the position of the vibration source is $\sim c/n_{eff}BW_{vib}$, where $BW_{vib}$ is the bandwidth of $\hat{\theta}_{vib,W-E}[n]$ and $\hat{\theta}_{vib,E-W}[n]$. The the wider the BPF in FIG. 9—which is a schematic diagram showing illustrative DSP operations to determine the location of point source vibration from the optical phases tracked by two bidirectional digital coherent transponders according to aspects of the present disclosure—the more accurately the location of the vibration can be determined subject to constraint by noise.

Figure 10:
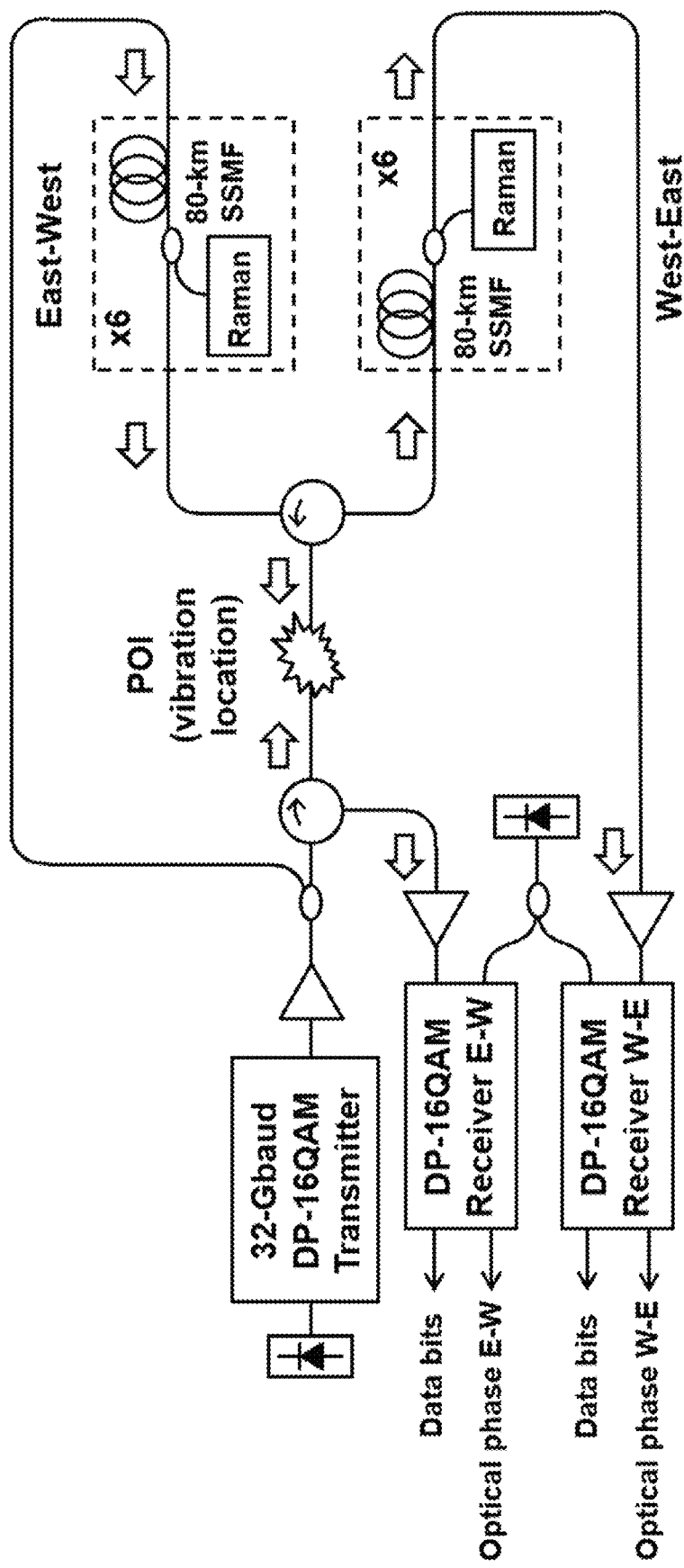
FIG. 10 is a schematic diagram showing an experimental setup demonstrating vibration source localization using a bidirectional digital coherent data link according to aspects of the present disclosure.

FIG. 10 is a schematic diagram showing an experimental setup demonstrating vibration source localization using a bidirectional digital coherent data link according to aspects of the present disclosure. The "point source" vibration is the same optical cable suspended on utility poles shown previously in FIG. 5. In the East-West direction, 6×80-km spans of standard single-mode fiber (SSMF) using all-Raman amplification precede the suspended cable; in the West-East direction, 6×80-km spans of SSMF are placed after the suspended cable. The transponder transmits DP-16QAM at 32-Gbaud (raw data rate of 128-Gb/s), and the E-W and W-E signals are detected by its dedicated receiver which also tracks optical phase as per the operations already described in Eq. (2-5).

Figure 11A:
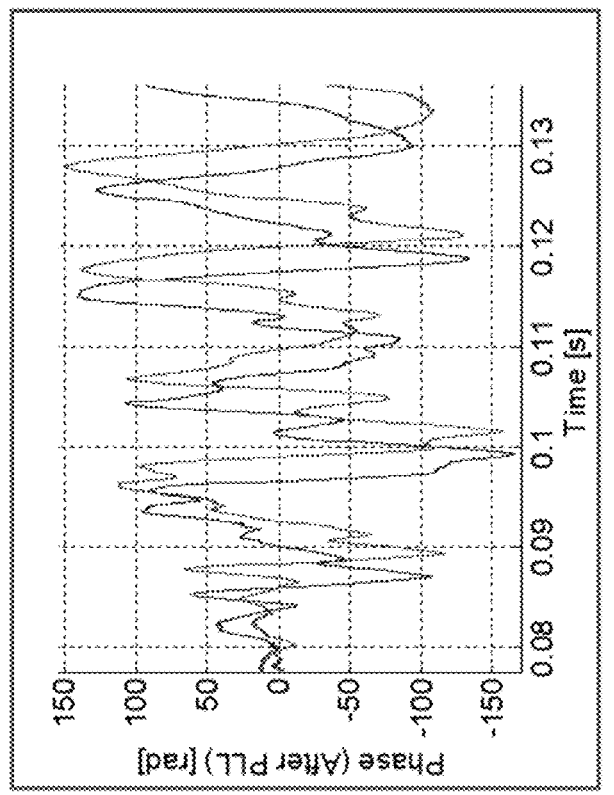
FIG. 11(A) and FIG. 11(B) are plots showing results of vibration localization experiment, (a) Phase after PLL measured for each direction, inset shows that the W-E phase leads the E-W phase, (b) Spectrum of W-E phase, (c) correlation between W-E and E-W phases, with maximum correlation at ~480 km.
Figure 11A:
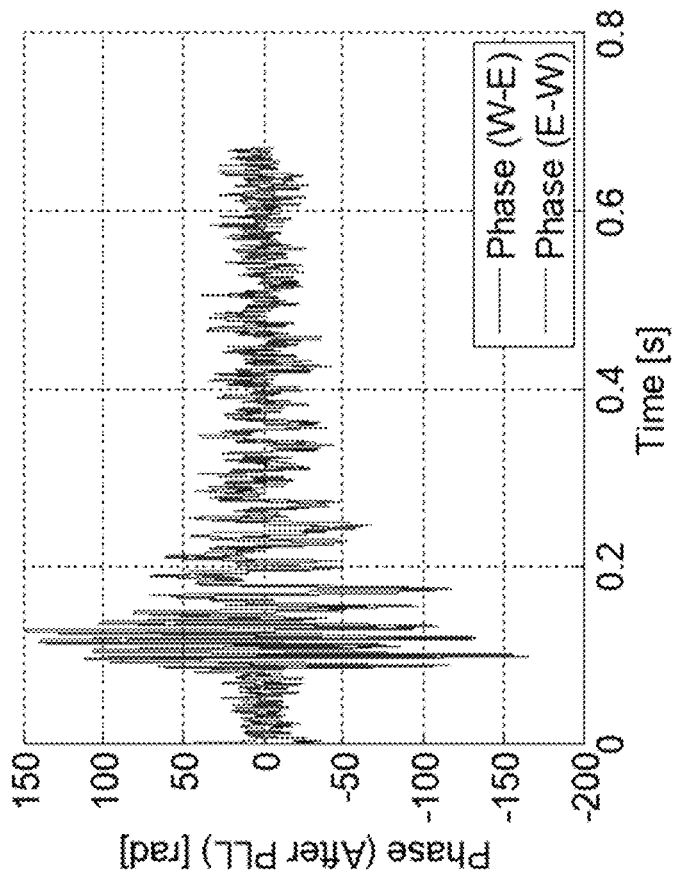
Figure 11B:
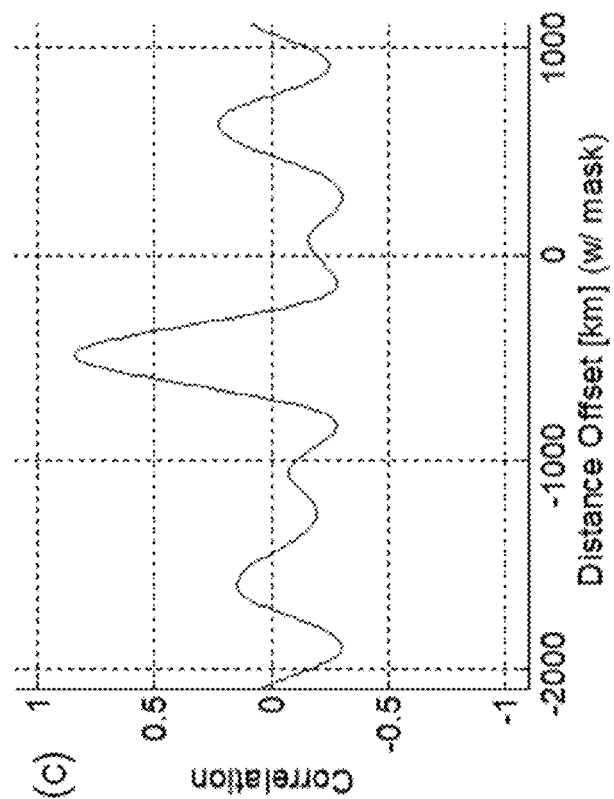
Figure 11B:
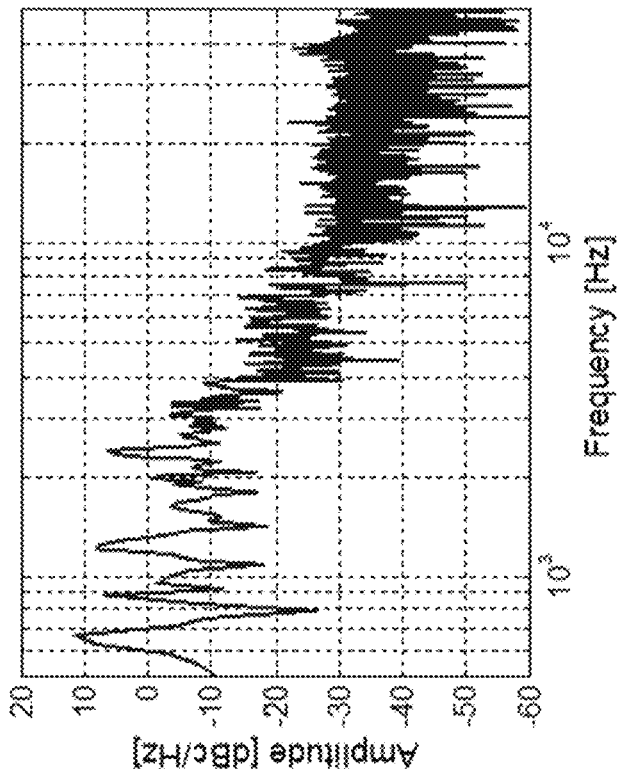

FIG. 11(A) and FIG. 11(B) are plots showing results of vibration localization experiment, (a) Phase after PLL measured for each direction, inset shows that the W-E phase leads the E-W phase, (b) Spectrum of W-E phase, (c) correlation between W-E and E-W phases, with maximum correlation at ~480 km.

FIG. 11(A) shows the phases measured by the E-W and W-E transponders, where a relative delay between the two measurements is clearly visible. Note that the Fourier transforms of $\hat{\theta}_{vib,W-E}[n] \overset{\mathcal{F}}{\Leftrightarrow} \hat{\theta}_{vib,W-E}[k]$ and $\hat{\theta}_{vib,W-E}[n] \overset{\mathcal{F}}{\Leftrightarrow} \hat{\theta}_{vib,W-E}[k]$ decay with frequency as $\sim 1/f$, as shown by the approximately −20 dB per decade slope in FIG. 11(B). In order to achieve a narrow, sinc-like correlation function with positional uncertainty $\sim c/n_{eff}BW_{vib}$, the phases $\hat{\theta}_{vib,W-E}[n]$ and $\hat{\theta}_{vib,E-W}[n]$ should first be amplitude-equalized by a filter with transfer function $H_{eq}[k] \propto k$. The position of the vibration can be estimated by curve-fitting a sinc function to determine the peak position $\hat{z}_{vib}=(c_f)\Delta\tau$. The additional plot of FIG. 11(B) shows the correlation between the two phases after amplitude equalization, with $\hat{z}_{vib} \approx 480$ km correctly estimated. The DSP operations for vibration localization are summarized in FIG. 9.

We demonstrate vibration detection and localization based on extracting optical phase from the DSP elements of a coherent receiver in bidirectional transmission of 200-Gb/s DP-16QAM WDM channels over 380 km of installed field fiber.

There has been a recent trend towards using the optical fiber infrastructure for environmental monitoring. Distributed acoustic sensing (DAS) is one distributed fiber optic sensing (DFOS) technique that provides high vibration sensitivity and localization accuracy. However. DAS relies on Rayleigh back-scatter and is incompatible with existing telecom infrastructure due to the unidirectional operation of inline amplifiers. This restricts the operational range of DAS making it difficult to scale for wide area deployment. Recently, vibration detection based on forward transmission using state-of-polarization (SOP) extracted from digital coherent transponders was demonstrated. However, it is difficult to localize the vibration's position using SOP.

Another forward transmission technique using ultra-low phase noise laser interferometry was demonstrated in. The use of optical phase has higher sensitivity and bandwidth than SOP, and localization is possible by correlating the phases measured by the interferometers at each end of a bidirectional link [4]. However, localization capability has only been demonstrated in lab experiment so far [5]. In addition, to implement laser interferometry will require sending and receiving continuous wave (c.w.) tones using dedicated sensing equipment, and the sensing channel is unavailable for data transmission.

In this paper, we implemented an in-service cable vibration monitoring scheme based on optical phase recovered by coherent telecom transponders where phase is already tracked by adaptive digital signal processing (DSP) elements in the receiver. This method enables telecom transponders to perform vibration monitoring as an auxiliary function, requiring only small DSP overhead and the use of a low-phase-noise laser for the sensing transponder.

We demonstrate our scheme on a 380-km field fiber link and demonstrate the optical phase extracted from a coherent transponder has similar performance as using c.w. signals, and we demonstrate the detection and localization of various events.

In a coherent receiver, optical phase is tracked by the frequency offset compensator (FOC), adaptive time-domain equalizer and carrier phase recovery (CPR). We can reconstruct the tracked phase by $$\hat{\theta}[n] = -2\pi\Delta\Omega n + arg\{\Sigma_{ij}\overline{w}_{ij}^{(n)} e^{-j\Delta\psi[n]}\}$$

where $\Omega\Delta$ is the digital frequency of the FOC, $\overline{w}_{ij}^{(n)}$ is the mean value (DC component) of the TDE coefficients between received polarization j and output polarization i, and $\Delta\psi[n]$ is the phase of the CPR. $\hat{\theta}[n]$ has contributions by laser phase noise as well as phase fluctuation induced by vibration.

Figure 13A:
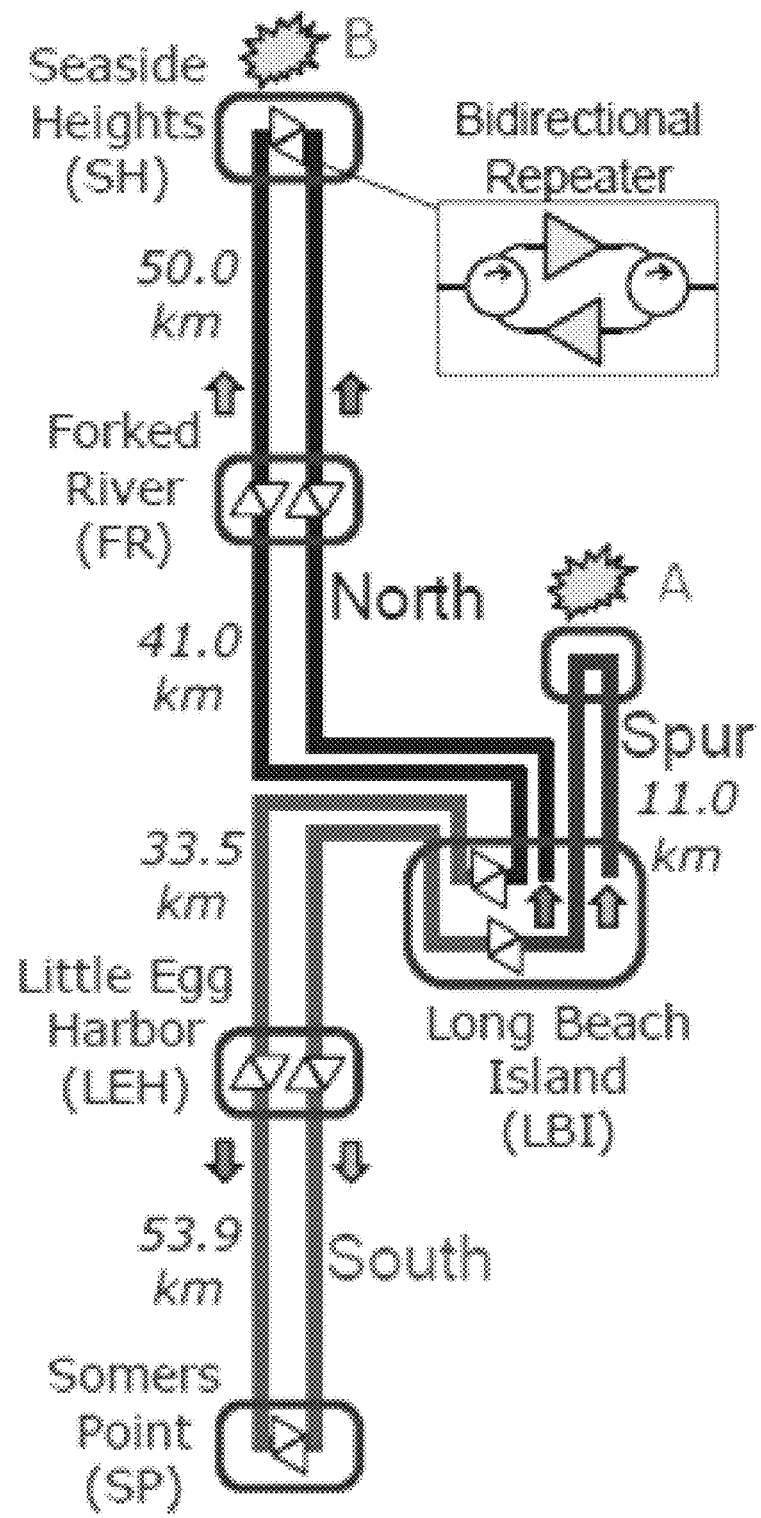
FIG. 13(A) and FIG. 13(B) are schematic diagrams illustrating FIG. 13(A) a bidirectional link and FIG. 13(B) an experimental setup of bidirectional transponder according to aspects of the present disclosure.

We can extract the vibration component according to FIG. 12, where $\hat{\theta}[n]$ is passed through a digital phase-locked loop (DPLL) to remove slowly-varying laser frequency drift, followed by a bandpass filter (BPF) and amplitude equalizer (AEQ) optimized for the vibration signature we wish to detect A field trial was conducted over in-service cables from Long Beach island (LBI), NJ, with fiber-pair connections to Seaside Height (SH) in the north, Somers Point (SP) in the south, and an 11-km spur. Since vibration localization requires a bidirectional link for phase correlation and time synchronization, we configured the fiber link as shown in FIG. 13(A) where both transponders are co-located at LBI, and bidirectional signals propagate in clockwise (CW) and counter-clockwise (CCW) directions. As same-fiber bidirectional transmission is susceptible to reflections by Rayleigh backscatter and connectors/splices, we transmit on only even channels (192.20□195.30 THz @ 100 GHz spacing) in the CW direction, and odd channels (192.15□195.25 THz @ 100 GHz spacing) in CCW. The distance of the loop is 378.8 km, of which 25% are overhead cables suspended on utility poles and 75% are buried cables.

The link includes 9 spans of standard single-mode fiber (SSMF) with losses ranging from 14-22 dB. Bidirectional DPLL BPF AEQ repeaters consisting of two erbium-doped fiber amplifiers (EDFAs) and circulators were inserted after each span.

Figure 13B:
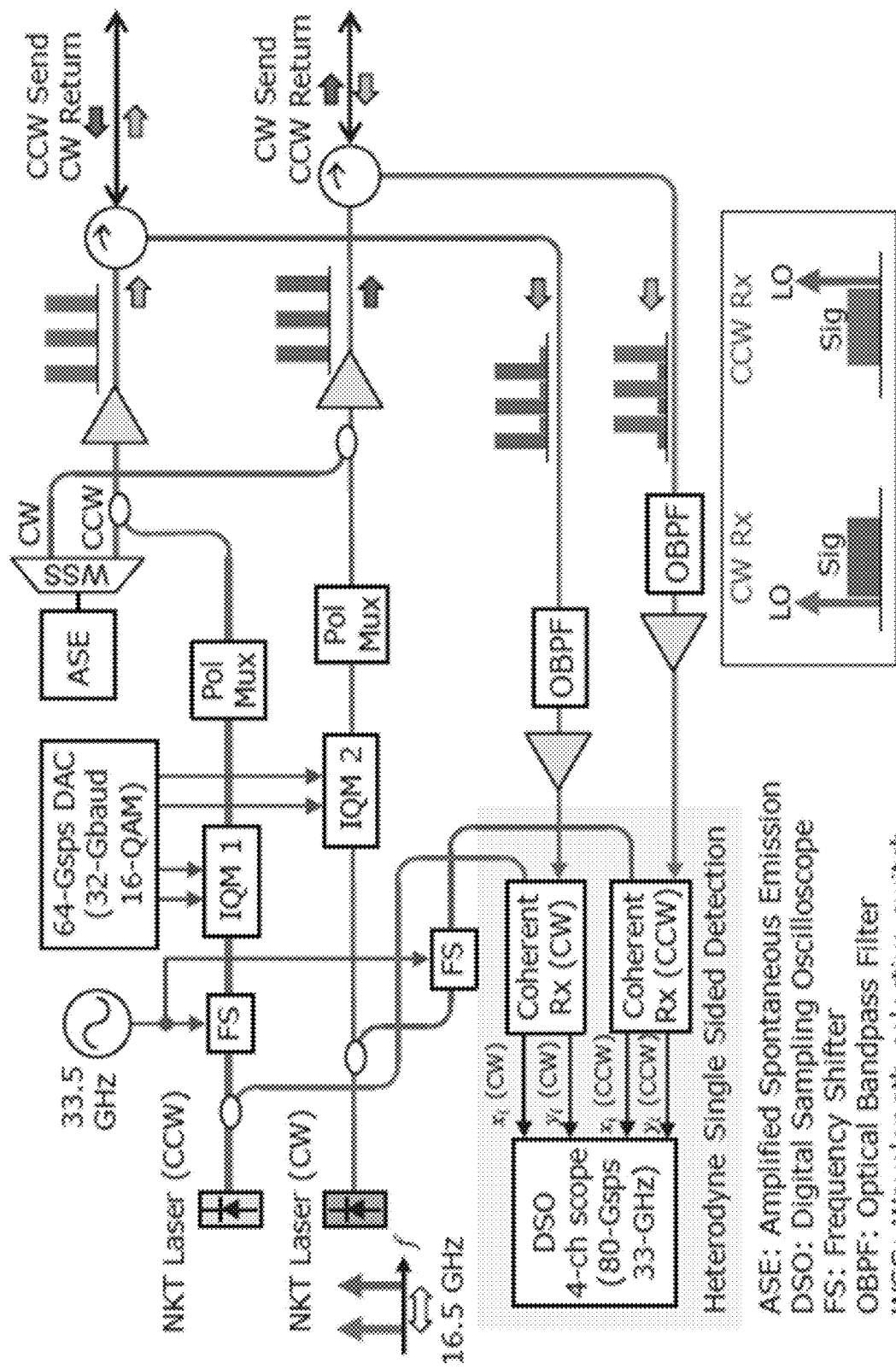

To mitigate accumulated double reflections, optical interleavers were inserted at amplifier mid-stages at LBI and SP. The setup of the transponder pair is shown in FIG. 13(B). Two low-phase-noise NKT-X15 lasers at 193.4 (CW) and 193.3835 THz (CCW) served as seed lasers. The CCW laser is downshifted by 33.5 GHz (193.35 THz) before data modulation, so it aligns to the 50 G grid. A 4-channel 64-GSa/s digital-to-analog converter (DAC) modulated 32-Gbaud 16-QAM signals onto the lasers via I/Q modulators. After polarization-multiplexing with delay and polarization combine circuits, each DP-16QAM signal is multi-plexed with 31 other 100-GHz spaced channels emulated by carving and flattening an ASE source with a wavelength selective switch (WSS). The CW and CCW signals are launched into the link via circulators. Launch power at each span was roughly optimized using the GN model.

At the receiver, the CW signal is mixed with the CCW laser serving as local oscillator (LO) in a dual-polarization optical hybrid followed by balanced photodetection; while for the CCW signal, the LO is obtained by downshifting the CW laser by 33.5 GHz. As 32-Gbaud DP-16QAM centered about the intermediate frequency (IF) of 16.5 GHz between the seed lasers fit on one side of an 80-GSa/s Keysight digital sampling oscilloscope (DSO) with 33-GHz bandwidth, we used heterodyne detection to recover the electric fields. This allowed signals in both CW and CCW directions to be recovered by the same 4-channel DSO, guaranteeing time synchronization. Optical bandpass filters (OBPF) were used to reject image-hand noise. Due to imperfect image-band rejection and reduced effective number of bits (ENOB) at high frequencies, heterodyne detection has 0.5 dB worse performance than homodyne detection.

The DSO was operated in "sequential capture mode" at a frame rate of 200 kHz. In each frame, 10 ns (320 symbols) was acquired. The adaptive DSP converges sufficiently within 10 ns to allow recovers' of $\hat{\theta}[n]$.

As the DSO captured up to 131,072 frames, we can measure $\hat{\theta}[n]$ for 0.65 second at 200 kHz, which is fast enough to track frequency drift of the NKT lasers as well as vibration events of interest. Our setup also enables comparison between using data-modulated signals with c.w. signals for vibration detection/localization. In case of c.w., the DAC and IQM are reconfigured as 8-GHz frequency shifters; and instead of performing coherent receiver DSP, the received signal is digitally shifted by the remaining 8.5 GHz, and the phase of the mean of the samples in that frame is $\hat{\theta}[n]$ (equivalent to finding the phase of the DC component of the FFT).

Our results have shown that there is not difference between using data modulated c.w. signals to recover $\hat{\theta}[n]$. When the BPF and AEQ are optimized, the correlation between CW and CCW phases was 97%. To allow better localization and ability to detect multiple simultaneous vibration events, we sacrificed correlation by increasing the bandwidth of the BPF. We note further that our data shows a correlation between CCW and CW phases, where a peak of −1.67 ms is observed, corresponding to the propagation delay difference between LBI and A in the CCW and CW directions. The full-width half-maximum (FWHM) of the sinclike main lobe is 1.07 ms (221 km), or roughly $c/n_{eff}B$ where B is the bandwidth of the BPF. Over 20 measurements, the standard deviation in delay difference was 34 μs (~7 km). The s.d. as a measure of uncertainty in vibration position is s smaller than the FWHM of the correlation function due to high phase SNR.

We vibrated the cable similarly by striking a utility pole at B in (FIG. 3(A)) and the correlation has a peak at +0.96 ms. When both utility poles were simultaneously struck ever ~0.5 s, and the strikes coincide by chance, the correlation is determined. Our findings indicate that detecting multiple vibration events is possible As those skilled in the art will appreciate, the ability to detect/localize vibration events depend on phase SNR and bandwidth. To be detectable, there must exist frequencies where an event is above the ambient level due to laser phase noise and ambient vibration. Striking a utility pole with a hammer on which an overhead cable is suspended creates vibration with frequencies above ambient up to 1-3 kHz, depending on the force used and the length of cable involved. We also tested an intrusion scenario where a cable loop outside the building at LBI connecting the spur and south sections was struck; and a tampering scenario where a patch cord at the output of the EDFA connecting the north and south cables was struck. Intrusion has lower bandwidth than tampering as the rigid cable muffles more high frequencies than the patch cord.

In this field trial, the CCW and CW signals propagated on the same fiber. This was due to only one fiber pair being available for testing. In a real-world scenario, bidirectional signals would travel on different fibers in the same cable, so their phases will be less well correlated than same-fiber propagation. We performed in-house testing before the field trial. In "back-to-back" transmission over a cable suspended on a utility pole that was struck by a hammer, the correlation measured in propagation on different fibers was 95% —only marginally less than same-fiber propagation of 99%.

Finally, to verify our setup is compatible with data transmission, we performed a standard bit-error rate (BER) sweep of all 64 channels (32 in each direction). The transmitter was reconfigured with two groups of three external cavity lasers (ECL) are modulated by the two IQMs in FIG. 13(B), interleaved in a-b-a-b-a-b fashion at 100 GHz spacing, which are then multiplexed with ASE loading channels. The CW and CCW direction were measured separately. All channels achieved BER below the SD-FEC limit.

As such, we have now disclosed and demonstrated for a first-time vibration detection and localization based on the extraction of optical phase from payload-carrying telecommunications signal using a coherent receiver in a bidirectional WDM transmission system. We detected real-world vibration events such as pole knocking, intrusion and fiber tampering over 380 km of deployed field fiber. While localization accuracy depends on the bandwidth of the vibration event above the ambient level, our disclosed system and method allows coherent telecommunications transponders to perform vibration monitoring as an auxiliary function with only small DSP overhead and using a low phase noise laser for the sensing transponder.

At this point, while we have presented this disclosure using some specific examples, those skilled in the art will recognize that our teachings are not so limited. Accordingly, this disclosure should be only limited by the scope of the claims attached hereto.

The invention claimed is:

1. A system for simultaneous coherent optical fiber transmission and vibration sensing comprising:
   an optical fiber transmission medium;
   a transceiver in optical communication with the optical fiber transmission medium, the transceiver including
      a coherent optical receiver responsive to a received optical signal and a local oscillation signal for detecting a received optical signal carrier wave; and
      a digital signal processor configured to recover digital data conveyed in the received optical signal and track optical phase of the received optical signal and determine vibration-induced strain of the optical fiber transmission medium;
   wherein the digital data recovery and determination of vibration-induced strain of the fiber transmission medium are performed simultaneously; and
   wherein the digital signal processor is configured to track optical phase of the received optical signal by combining phase embedded by adaptive digital signal processing elements including frequency offset compensation, adaptive time-domain equalization, and carrier phase recovery.

2. The system of claim 1 wherein the transceiver further includes a phase-locked loop followed by a bandpass filter to separate the vibration-induced phase change from any other sources of phase change including frequency drift and laser phase noise.

3. The system of claim 2 wherein the transceiver determines the vibration-induced phase change at a rate lower than a baud rate of the received optical signal.

4. The system of claim 3 further comprising a second transceiver located at an opposite end of the optical fiber transmission medium from the transceiver, said transceivers configured to transmit data-modulated optical signals to each other wherein the two transceivers independently determine vibration-induced phase change from an optical signal transmitted by the other transmitter.

5. The system of claim 4 wherein the two transceivers independently determine a location of a vibration occurring at a location along the optical fiber transmission medium by correlating the phase determinations of each transceiver.

6. The system of claim 5 in which estimates of vibration-induced phase are made by each transceiver and applied to an amplifier equalizer before correlation.

7. The system of claim 6 wherein the optical fiber transmission medium includes at least two separate optical fibers through which a bidirectional link is established on the two separate optical fibers.

8. The system of claim 7 wherein at least a portion of the two optical fibers coexist as part of a common optical fiber cable.

* * * * *